United States Patent
Piec et al.

(10) Patent No.: US 6,623,815 B2
(45) Date of Patent: Sep. 23, 2003

(54) DECORATIVE COMPONENT FOR USE AS A PIECE OF TRIM OF A VEHICLE

(75) Inventors: Emmanuel Piec, Harnes (FR); Jean-Yves Delattre, Harnes (FR)

(73) Assignee: Visteon Systemes Interieurs Societe par Actions Simplifiee, La Defense Cedex (FR)

( * ) Notice: Subject to any disclaimer, the term of this patent is extended or adjusted under 35 U.S.C. 154(b) by 0 days.

(21) Appl. No.: 09/747,232

(22) Filed: Dec. 26, 2000

(65) Prior Publication Data

US 2001/0000736 A1 May 3, 2001

Related U.S. Application Data

(62) Division of application No. 09/568,153, filed on May 10, 2000, now Pat. No. 6,464,917.

(30) Foreign Application Priority Data

May 12, 1999 (FR) ............................................ 99/06.248

(51) Int. Cl.[7] ............................................... B60R 13/00
(52) U.S. Cl. ........................ 428/31; 428/78; 428/542.2; 428/913.3
(58) Field of Search ........................... 428/542.2, 913.3, 428/78, 31; 264/266, 261, 255, 250, 254; 180/89.11, 90

(56) References Cited

U.S. PATENT DOCUMENTS 6,165,404 A * 12/2000 Savonuzzi .................. 264/266

* cited by examiner

Primary Examiner—Deborah Jones
Assistant Examiner—Abraham Bahta
(74) Attorney, Agent, or Firm—Harrison & Egbert

(57) ABSTRACT

A decorative component for use as a piece of trim of a vehicle having a sheet of material with a stiffening element affixed thereto. The sheet of material has an aspect conferring face on one face thereof. The stiffening element fixes the shape of the sheet of material relative to a desired shape of the decorative component. The stiffening element is a bead affixed to at least a portion of the periphery of the sheet of material. The bead can be wither continuous or discontinuous along the periphery.

4 Claims, 2 Drawing Sheets

DECORATIVE COMPONENT FOR USE AS A PIECE OF TRIM OF A VEHICLE

RELATED APPLICATION

The present application is a divisional application from U.S. Ser. No. 09/568,153, entitled "DECORATIVE COMPONENT, PROCESS OF MANUFACTURING A DECORATIVE COMPONENT, AND PROCESS OF USING A DECORATIVE COMPONENT AS A PIECE OF INTERNAL TRIM OF A VEHICLE BACKGROUND OF THE INVENTION, filed on May 10, 2000 now U.S. Pat. No. 6,464,917, to the present inventor.

FIELD OF THE INVENTION

The invention relates to a decorative component, designed, in particular, to be integrated in a piece of internal trim of a vehicle, as well as to a process for manufacturing such a decorative component, to a use thereof and to a process for manufacturing a piece of internal trim of a vehicle, for example a door panel, implementing said decorative component.

However, although more especially intended for such manufacturing processes, the component according to the invention can also be used for the manufacture of other types of part.

DESCRIPTION OF THE RELATED ART

At the present time, there are known pieces of internal trim for vehicles constituted by a layer of material, referred to as a 'carrier', having locally at least one aspect conferring area.

Said aspect conferring area is defined by a component constituted by a sheet of material, which is most of ten textile, and is secured to a stiffening insert provided beneath the entire face of said sheet opposite to its visible face. Said component is fixed to the carrier, the two pieces being produced previously and separately, according to the desired shapes.

Such processes thus necessitate additional operations on said decorative component, which increases the time taken to manufacture the piece of trim. Furthermore, the component is fixed to the carrier most often by gluing, welding, stapling, clipping and/or screwing, whereas such fixing methods can prove inadequate. Indeed, when such solutions are adopted, the edges of the component remain fragile and/or creases sometimes appear on its surface.

This being the case, in order to avoid having to effect additional operations, processes have been developed whereby the carrier is produced directly beneath the component, previously formed, and placed in a tool designed to mold the carrier. Said carrier is then produced by injection from different points for introduction of the material.

Nonetheless, such solutions lead to the presence of weld marks in areas in which the flows of injected material meet, and which may be partly visible, and/or lead to implementation problems, in particular owing to the high pressures that they may necessitate and which are liable to damage the aspect conferring area.

Steps thus have to be taken to ensure that the cladding is not wrinkled, does not tear, and is not excessively compressed, which could give it an undesirable shiny appearance.

BRIEF SUMMARY OF THE INVENTION

The object of the present invention is to provide a decorative component, including a sheet of material having an aesthetic appearance, and a process for manufacturing a piece of interior trim of a vehicle using such a decorative component, which overcomes the aforementioned drawbacks by facilitating optimum positioning and fixing of said sheet of material, even at its periphery.

Another object of the present invention is to provide a decorative component and a process for manufacturing a piece of interior trim of a vehicle using such a component which makes it possible to dispense with additional operations.

Another object of the present invention is to provide a decorative component and a process for manufacturing a piece of interior trim of a vehicle which make it possible to prevent, at the time of mounting the component, the appearance of weld marks, at the very least visible in part.

A further object of the present invention is to provide a decorative component and a process for manufacturing a piece of interior trim of a vehicle using a component which make it possible to implement low pressures at the time of manufacture.

Another object of the present invention is to provide a decorative component and a process for manufacturing a piece of interior trim of a vehicle which conserves material and simplifies tools that have to be used.

Further objects and advantages of the invention will emerge in the course of the description that follows, which is provided only by way of illustration and is not intended to limit same.

The invention relates, in the first place, to a decorative component, in particular one designed to form a piece of trim or to be integrated in a piece of interior trim of a vehicle, constituted by at least a sheet of material, provided with stiffening means and having, at least locally, on at least one of its faces, said aspect conferring faces, conferring an aesthetic and/or comfortable aspect, characterized by the fact that said stiffening means are constituted by a bead, whether continuous or discontinuous, of material, provided on one part at least of the periphery of said sheet in order to fix its shape according to that desired for said component.

The invention also relates to a process for manufacturing such a component, in which said sheet is shaped according to a desired profile and said peripheral bead is produced, and to a use of said component in a tool in respect of which said component is held and positioned by said peripheral bead.

The invention further relates to a process for manufacturing a piece of interior trim of a vehicle, for example a door panel, constituted by a layer of material, referred to as a carrier, having locally at least one aspect conferring area, characterized by the fact that:

in a first stage, a decorative component as described above is produced;

in a second stage, separate from the first one, the connection between said carrier and said decorative component is ensured in such a way that the aspect conferring area of said piece is defined, at least in part, by said aspect conferring face of the component.

BRIEF DESCRIPTION OF THE SEVERAL VIEWS OF THE DRAWINGS

The invention will be more readily understood from a study of the following description, accompanied by the annexed drawings, which form an integral part thereof.

DETAILED DESCRIPTION OF THE INVENTION

The invention relates, in the first place, to a decorative component, designed, in particular, to be integrated in a piece of interior trim of a vehicle. However, although more especially intended for such applications, said component can also be used in other types of part.

Figure 1:
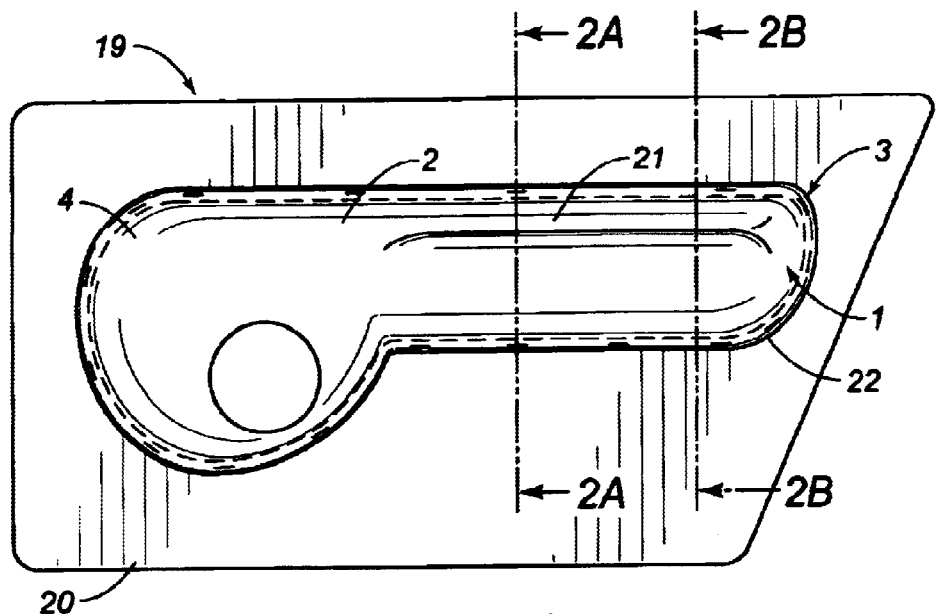
FIG. 1 illustrates a frontal view of a piece of trim obtained according to one exemplary form of embodiment of the process according to the invention.
Figures 2A, 2B:
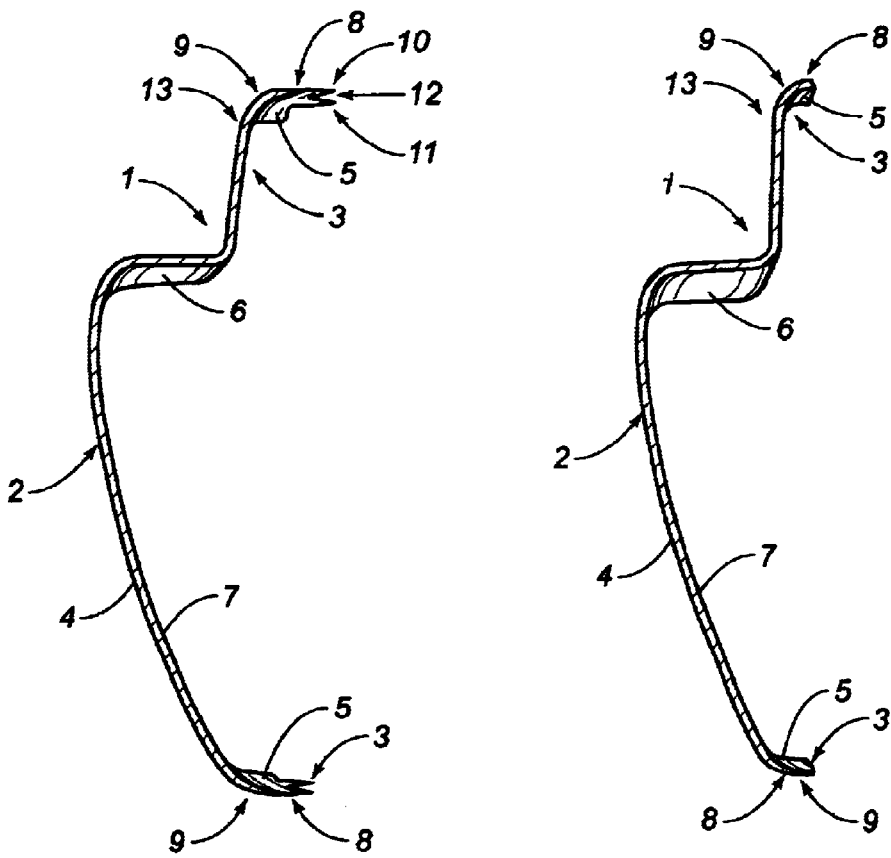
FIG. 2a is a partial cross-sectional view along line II$_a$—II$_a$ of preceding FIG. 1, illustrating an exemplary embodiment of the component according to the invention.
FIG. 2b is a partial cross-sectional view along line II$_b$—II$_b$ of preceding FIG. 1, illustrating another part of the component of FIG. 2.

As illustrated in FIGS. 1 and 2, said decorative component, identified by the number 1, is constituted by at least a sheet of material 2 provided with stiffening means 3. Said sheet of material further has, at least locally, on at least one of its faces, 4, referred to as an aspect conferring face, an aesthetic and/or comfortable aspect. This is to be taken as meaning that said sheet of material 2 is pleasant to the eye and/or touch, at the very least locally in the area of its said aspect conferring face or faces 4.

For this purpose, said sheet of material 2 is designed so as to be flexible and/or is made of textile materials. The word "flexible" is to be taken as meaning that said sheet of material becomes deformed by its very nature or its consistency, in particular under its own weight. It cannot, therefore, retain by itself, after becoming deformed, a given shape, or even a contour having a given profile, if it is not supported.

According to the invention, said stiffening means 3 are constituted by a bead 5, which is continuous or discontinuous, of material. Said bead 5 is provided over a part at least of the periphery of said sheet 2 and thus makes it possible to fix its shape according to that wished for said component.

It is thus possible to obtain optimum fixing of the sheet of material 2 on its stiffening means 3 without excessive pressure as this fixing is carried out only in the area of the periphery of the sheet, that is to say where it is necessary but also sufficient.

In addition, when the component is mounted on another piece, the part of the latter located under said component, can simply have the role of maintaining the shape of said component, without now having necessarily to play an additional fixing role.

It should also be noted that said bead can obviate the need for additional operations during subsequent uses of said component 1 by providing an area for direct assembly of the latter to the other part or parts of the piece to be mounted.

Furthermore, said bead 5 can, in particular, play the part of a barrier between the flows of material that may be used to form the said piece and will then make it possible to prevent the appearance of weld marks, at the very least visible in part. It can also contribute to the tensioning of the sheet of material 2, through a pressure of the material on the inner part of the bead, like a "piston effect".

Said bead 5 is separate from said sheet of material 2. It is constituted by one or more materials different from that or those used to make said sheet, in particular thermoplastic materials.

According to a first form of embodiment, said component 1 is substantially flat, and said bead 5 is then contained in the plane in which said sheet of material 5 is stretched.

According to another form of embodiment, illustrated by that shown in the different figures, said component has a profile that is three-dimensional, in particular recessed and/or in relief. Said bead 5 then follows an irregular path enabling said sheet of material 2 to be given the desired profile or, at the very least, enabling its contour to be fixed along said path. Thus, said sheet will ultimately be able to regain said profile, in particular once it is placed opposite a cavity of the same shape, for example one located in the area of the punch and/or of the die of a mold, with the material of said sheet placing itself of its own accord at the desired point, thanks to the contour imposed by said bead.

Said component includes locally, one or more blocks of material 6, in particular foam, having a certain degree of flexibility, secured to said sheet of material 2.

Said bead 5 is provided on face 7 of sheet of material 2 opposite its aspect conferring face 4. The same applies, in particular, to any block or blocks of material 6.

The edges of said sheet of material 2 are secured in the area of a part of said bead 5 forming a skirt 8 for said component 1. Said sheet of material 2 thus possibly covers, at least in part, the outer lateral face 9 of said bead 5, Said component 1 can further include, in the area of said bead 5, means 10, whether continuous or discontinuous, for positioning said component.

According to a first form of embodiment, this concerns the shape imparted to the distal edge 11 of said bead 5 possibly designed to be beveled and stepped.

According to another form of embodiment, said positioning means 10 are constituted, as shown, by slots 12, provided, in particular, in the body of the material, in the area of said distal edge 11 of bead 5. Said slots 12 are defined in the width of said bead 5, by two facing tabs, spaced apart from one another.

Because of the positioning means 10, the tools used can thus be simplified.

By way of example, according to the form of embodiment illustrated, it will thus be noted that said bead 5 has a proximal edge 13 in contact with said sheet of material 2, opposite said distal edge 11, provided with said positioning means 10, the lateral face of bead 5 provided externally between said distal and proximal edges 11, 13 being covered, at least partially, by the edges of said sheet of material 2.

Figure 3:
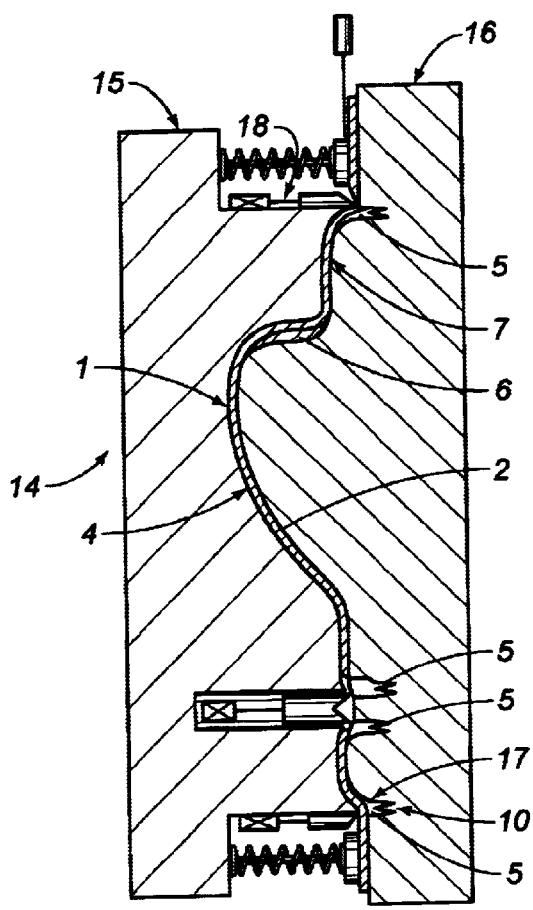
FIG. 3 is a cross-sectional view illustrating an example of a tool for implementing the process, according to the invention, for manufacturing the decorative component shown in preceding FIG. 2.

As illustrated in FIG. 3, the invention also relates to a process for manufacturing a decorative component 1, such as the one described above. According to this process, said sheet of material 2 is shaped according to a desired profile and said peripheral bead 5 is produced, thus making it possible to fix said profile. These two steps take place in succession.

The forming of the sheet of material 2 can be facilitated on the periphery, or on all or part, of the mold, or even on internal areas, with the use of means of assistance, such as, in particular, holding down clamps or a pinning frame, or similar devices.

Said bead 5 is produced, in particular, by injection molding and/or extrusion in a mold 14 in which the sheet of material 2 has been preformed. According to another form of embodiment, it can be produced in advance and then glued to said sheet of material 2.

One or more portions of the sheet of material 2, provided in excess beyond bead 5 can, possibly, be cut away. In this way, additional gains in material can be achieved, as cutting can be effected accurately in the area of said bead 5.

Furthermore, when said cutting operation is carried out, the edges of said sheet of material 2 can be applied in the area of skirt 8.

To implement such a process, said mold 14 is constituted, in particular, by two parts 15, 16 having, in the area of their surfaces of contact, the profile desired for component 1.

One, 16, of said parts of mold 14 is provided with a groove 17 permitting the formation of said bead 5.

Opposite part 15 is provided with cutting means 18 for cutting the edges of the sheet of material 2.

Thus, by way of example, to form said decorative component 1, the following steps are observed: mold 14 is opened, sheet of material 2 is placed between its two parts 15, 16 and said mold 14 is closed. Said bead 5 is injected under said sheet of material 2, then any excess amounts of said sheet of material are cut off; then mold 14 is opened.

The invention also relates to a use of said decorative component in a tool in respect of which said component is held and positioned by said peripheral bead. This can be the case of tool 24, discussed hereinafter.

Figure 4:
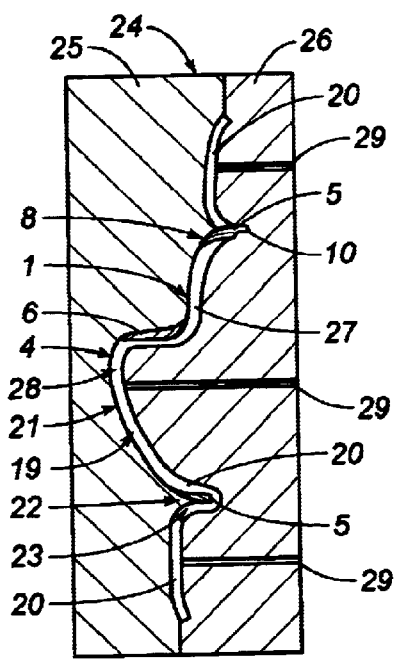
FIG. 4 is a cross-sectional view illustrating an example of a tool for manufacturing the piece of trim shown in preceding FIG. 1.
Figure 5:
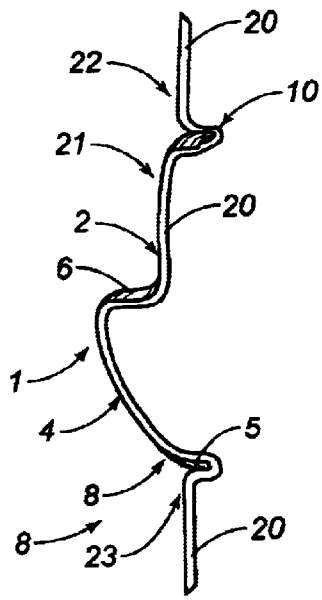
FIG. 5 illustrates a cross sectional view of a piece of trim obtained according to an alternative embodiment of the process for manufacturing a piece of trim according to the invention.

As illustrated in FIGS. 4 and 5, the invention also relates to a process for manufacturing a piece of interior trim of a vehicle, for example, a door panel.

Said piece of trim, identified by reference number 19, is constituted by a layer of material 20, referred to as a 'carrier', having, locally, at least one aspect conferring area 21.

According to the invention, to manufacture said piece, in a first step, a decorative component 1, such as the one described above, is produced, possibly using the aforementioned manufacturing process.

Then, in a second step, separate from the first one, the connection between said carrier 20 and said decorative component 1 is provided in such a way that the aspect conferring area 21 of said piece 19 is defined, at least in part, by said aspect conferring face 4 of said component 1.

There is thus produced a piece of trim in which, as already mentioned, the aspect conferring area is positioned and/or fixed in an optimum manner on carrier 20, by means of said bead 5. This is accomplished without any additional operations and with a reduction of the risk of weld marks appearing between the different parts of said carrier 21.

Furthermore, as the latter now has only the role of positioning and/or maintaining in shape sheet of material 2, and no longer that of fixing it, the pressures in the tool can be reduced, and the risks of damage to said sheet of material 2 are avoided.

Said carrier 20 is produced by injection and/or extrusion/compression and/or thermocompression molding. It is provided, in particular, beneath said component 1 and/or it defines a frame, at least a partial one, around it.

According to one form of embodiment, illustrated in FIG. 4, said carrier 20 is secured to said bead 5 in the area of their respective end edges.

According to another form of embodiment, illustrated in FIG. 5, said carrier 20 is over-molded above distal edge 11 of said bead 5.

In this way, the connection is ensured between said component 1 and said carrier 20 at least in the area of bead 5 of said component 1.

According to one particular form of embodiment of the invention, a groove 22 is formed in the area of a zone of contact between said bead 5 and a visible part of said carrier 20, the edge of said sheet of material 2 being provided so as to be inserted into said groove 22. In this way the finish of the piece of trim is further improved.

Said groove 22 is produced by providing facing skirt 8 of component 1, and a skirt 23 on carrier 20.

The relative positioning of component 1 in said piece of trim 19 can be ensured by means of said bead 5 having a positioning means 10.

If blocks 6 of material are used, these are fixed to said sheet of material 2 during said first step, that is to say in said mold 14 used to manufacture component 1.

To implement said process for manufacturing piece of trim 19, use can be made, in particular, of a second mold, 24, in two parts 25, 26, between which a gap 27 is defined to produce carrier 20.

One, 26, of the parts of said second mold 24 has, in the area of gap 27, a cavity 28 in which to put said component 1 into place. Its profile matches that imparted to the sheet of material 2 in said mold 14 used to manufacture said component 1.

Different points of injection 29 are provided on the other part, 26, of said second mold 24 on one hand, opposite cavity 28 for forming the part of carrier 20 located beneath said component 1 and, on the other hand, beyond for forming the rest of said carrier 20.

In the area of said portion 26 having injection points 29, positioning grooves can be provided to cooperate with said slots 12 of component 1.

It is thus possible to obtain a piece of trim 19 in the following steps: a component 1 is manufactured in mold 14, as described above, the other mold, 24, is opened, and said component 1 is placed in cavity 28 said second mold 24 is closed, and said carrier 20 is injected both beneath said component 1 and around it, possibly sequentially, said second mold 24 is cooled down so that it can finally be opened so that formed item 19 can be stripped therefrom.

According to one particular form of embodiment of the invention, said first and second steps can be carried out in "hidden time", possibly in the same tool, such as a multiple mold.

Other forms of embodiment, within the grasp of one skilled in the art, could, of course, have been devised without thereby departing from the scope of the invention.

What is claimed is:

1. A decorative component for use as a piece of trim of a vehicle, the decorative component comprising:
   a flexible sheet of material having a front face and a back face, said front face being an aspect conferring face, said sheet of material having a periphery;
   a stiffening means for fixing a shape of said sheet of material relative to a desired shape of the decorative component, said stiffening means comprising a flexible bead affixed to at least a portion of only said periphery of said back face of said sheet of material, said bead being continuous or discontinuous at said periphery, said stiffening means for causing said sheet of material to have a greater rigidity along said periphery than a rigidity interior of said periphery; and at least one block of material secured to a portion of said sheet of material, the block being flexible.

2. The decorative component of claim 1, said sheet of material having edges secured to a part of said bead, said edges and said bead forming a forming a skirt of the decorative component.

3. The decorative component of claim 1, further comprising:

positioning means formed in said bead, said positioning means for positioning the decorative component onto the vehicle.

4. A decorative article for internal trim of a vehicle comprising;

a decorative component having a flexible sheet of material with a front face and a back face, said front face being an aspect conferring face, said sheet of material having a periphery, said decorative component having a stiffening means for fixing a shape of said sheet of material relative to a desired shape of said decorative component, said stiffening means comprising a flexible bead affixed to and extending along at least a portion of only said periphery of said back face of said sheet of material, said stiffening means for causing said sheet of material to have a greater rigidity along said periphery than a rigidity interior of said periphery;

a carrier having an aspect conferring area, said carrier being a layer of material, said carrier being connected to said decorative component such that said aspect conferring area is covered at least partially by said aspect conferring face of said decorative component; and a groove formed in an area of contact between said bead and a visible part of said carrier, said sheet of material having an edge inserted into said groove.

* * * * *